(12) United States Patent
Baek et al.

(10) Patent No.: US 6,697,135 B1
(45) Date of Patent: Feb. 24, 2004

(54) TRANSFLECTIVE LIQUID CRYSTAL DISPLAY DEVICE HAVING REFLECTIVE AND TRANSMISSIVE MODE PARITY

(75) Inventors: Heum Il Baek, Seoul (KR); Yong Beom Kim, Suwon (KR); Kyoung Su Ha, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 153 days.

(21) Appl. No.: 09/697,328

(22) Filed: Oct. 27, 2000

(30) Foreign Application Priority Data

Oct. 27, 1999 (KR) .......................... 1999-46946
Dec. 11, 1999 (KR) .......................... 1999-56883
Apr. 14, 2000 (KR) .......................... 2000-19715

(51) Int. Cl.$^7$ ................................. G02F 1/13
(52) U.S. Cl. ........................ 349/106; 349/113
(58) Field of Search ..................... 349/113, 114, 349/106, 107

(56) References Cited

U.S. PATENT DOCUMENTS

| | | | | |
|---|---|---|---|---|
| 6,124,909 A | * | 9/2000 | Miyashita et al. | 349/109 |
| 6,215,538 B1 | * | 4/2001 | Narutaki et al. | 349/106 |
| 6,259,500 B1 | * | 7/2001 | Kijima et al. | 349/113 |
| 6,380,995 B1 | * | 4/2002 | Kim | 349/113 |

* cited by examiner

*Primary Examiner*—James Dudek
(74) *Attorney, Agent, or Firm*—Birch, Stewart, Kolasch & Birch, LLP (57) ABSTRACT

The invention provides a transflective liquid crystal display device which can achieve substantially the same color purity regardless of the selected mode (transmissive or reflective) by controlling the density of a uniformly thick color filter layer or the thickness of a uniformly dense color filter layer, or by having another color filter layer that affects light only in the transmissive mode. The invention emphasizes the thickness of the color filter through which light passes or the density of the color filter through which light passes, in order to achieve substantially uniform color purity.

17 Claims, 6 Drawing Sheets

TRANSFLECTIVE LIQUID CRYSTAL DISPLAY DEVICE HAVING REFLECTIVE AND TRANSMISSIVE MODE PARITY

CROSS REFERENCE

This application claims the benefit of Korean Patent Application Nos. 1999-46946, 1999-56883, and 2000-19715, filed on Oct. 27, 1999, on Dec. 11, 1999, and on Apr. 14, 2000, respectively, under 35 U.S.C. §119, the entirety of each of which is hereby incorporated by reference.

BACKGROUND

1. Field of the Invention

The present invention relates to a liquid crystal display (LCD) device, and more particularly, to a transflective LCD device.

2. Description of Related Art

In general, liquid crystal displays are divided into transmissive LCD devices and reflective LCD devices according to whether the display uses an internal or external light source.

A typical transmissive LCD device includes a liquid crystal panel and a back light device. The liquid crystal panel includes upper and lower substrates with a liquid crystal layer interposed. The upper substrate includes a color filter, and the lower substrate includes thin film transistors (TFTs) as switching elements. An upper polarizer is arranged on the liquid crystal panel, and a lower polarizer is arranged between the liquid crystal panel and the backlight device.

Figure 1:
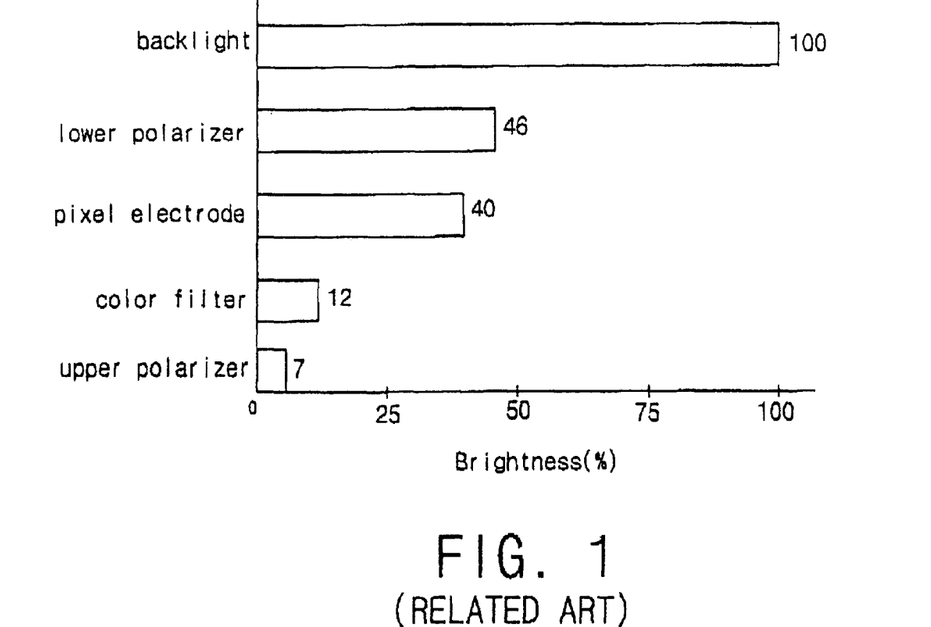
FIG. 1 is a graph illustrating transmittance after light passes through each layers of a typical transmissive LCD device.

The two polarizers have a transmittance of 45% and, the two substrates have a transmittance of 94%. The TFT array and the pixel electrode have a transmittance of 65%, and the color filter has a transmittance of 27%. Therefore, the typical transmissive LCD device has a transmittance of about 7.4% as seen in FIG. 1, which shows a transmittance (in brightness %) after light passes through each layer of the device. For this reason, the transmissive LCD device requires a high, initial brightness, and thus electric power consumption by the backlight device increases. A relatively heavy battery is needed to supply a sufficient power to the backlight of such a device. However, this has a problem that the battery can not be used for a lengthy period of time.

In order to overcome the problem described above, the reflective LCD has been developed. Since the reflective LCD device uses ambient light, it is light and easy to carry. Also, the reflective LCD device is superior in aperture ratio to the transmissive LCD device.

Figure 2:
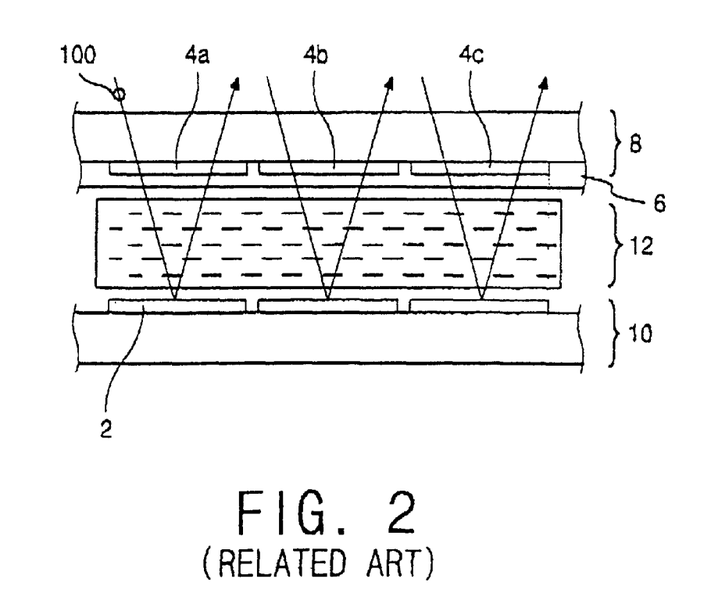
FIG. 2 is a cross-sectional view illustrating a typical reflective LCD device.

FIG. 2 shows a typical reflective LCD device in cross section. As shown in FIG. 2, the reflective LCD device includes upper and lower substrates 8 and 10 with a liquid crystal layer 12 interposed. The upper substrate 8 includes color filter layers 4a, 4b and 4c (e.g., red, green, and blue) and a common electrode 6. The lower substrate 10 to includes a switching element (not shown) and a reflective electrode 2.

Ambient light 100 passes through the upper substrate 8 and the liquid crystal layer 12 and is reflected on the reflective electrode 2. When electrical signals are applied to the reflective electrode 2 by the switching element, phase of the liquid crystal layer 12 varies. Then, reflected light is colored by the color filter layers 4a, 4b and 4c and displayed in the form of images.

However, the reflective LCD device is affected by its surroundings. For example, the brightness of ambient light in an office differs largely from that outdoors. Even in the same location, the brightness of ambient light depends on the time of day (e.g., noon or dusk).

Figure 3:
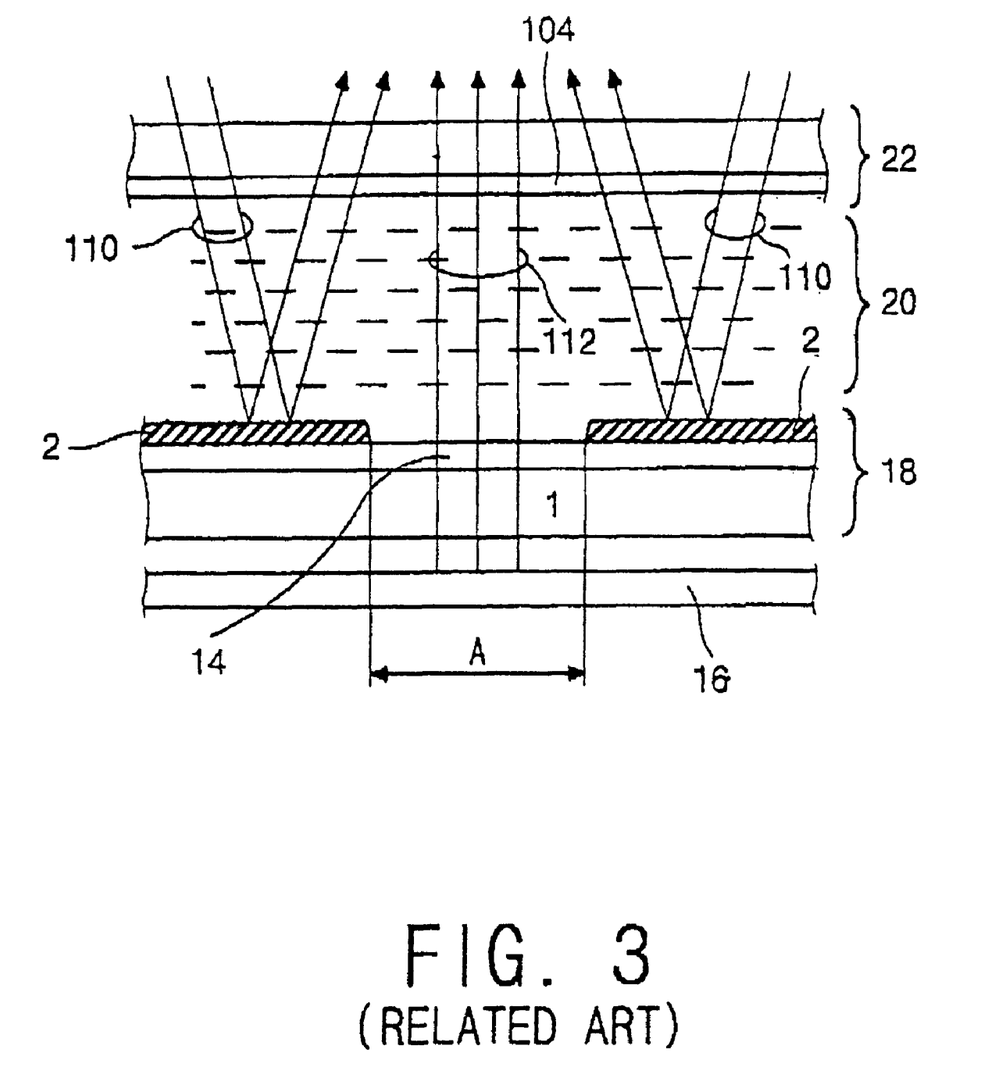
FIG. 3 is a cross-sectional view illustrating a conventional transflective LCD device.

In order to overcome the problems described above, a transflective LCD device has been developed. FIG. 3 shows a conventional transflective LCD device. As shown in FIG. 3, the conventional transflective LCD device includes upper and lower substrates 22 and 18 with a liquid crystal layer 20 interposed. The upper substrate 22 includes a color filter 104, and the lower substrate 18 includes a switching element (not shown), a pixel electrode 14 and a reflective electrode 2. The reflective electrode 2 is made of an opaque conductive material having a good reflectance and light transmitting holes "A" are formed therein. The transflective LCD device further includes a backlight device 16. The light transmitting holes "A" serve to transmit light 112 from the backlight device 16.

The transflective LCD device in FIG. 3 is operable in transmissive and reflective modes. First, in reflective mode, the incident light 110 from the upper substrate 22 is reflected on the reflective electrode 2 and directed toward the upper substrate 22. At this time, when electrical signals are applied to the reflective electrode 2 by the switching element (not shown), phase of the liquid crystal layer 20 varies and thus the reflected light is colored by the color filter 104 and displayed in the form of images.

Further, in transmissive mode, light 112 generated from the backlight device 16 passes through portions of the pixel electrode 14 corresponding to the transmitting holes "A". When the electrical signals are applied to the pixel electrode 14 by the switching element (not shown), phase of the liquid crystal layer 20 varies. Thus, the light 112 passing through the liquid crystal layer 20 is colored by the color filter 104 and displayed in the form of images.

As described above, since the transflective LCD device has both transmissive and reflective modes, the transflective LCD device can be used without regard to the time of day (e.g., noon or dusk). It also has the advantage that it can be used for a long time by consuming low power. However, since the reflective electrode has the transmitting holes "A", the conventional transflective LCD device has a very low light utilizing efficiency compared to either the reflective LCD device or the transmissive LCD device alone.

In the reflective mode of the transflective LCD device, incident light enters the color filter 104 and is reflected on the reflective electrode 2 and reenters the color filter 104. That is, the light passes through the color filter twice. But, in the transmissive mode, light from the backlight 16 passes through the color filter once. Thus, the color purity that users perceive varies according to the mode of the LCD device.

Figure 4A:
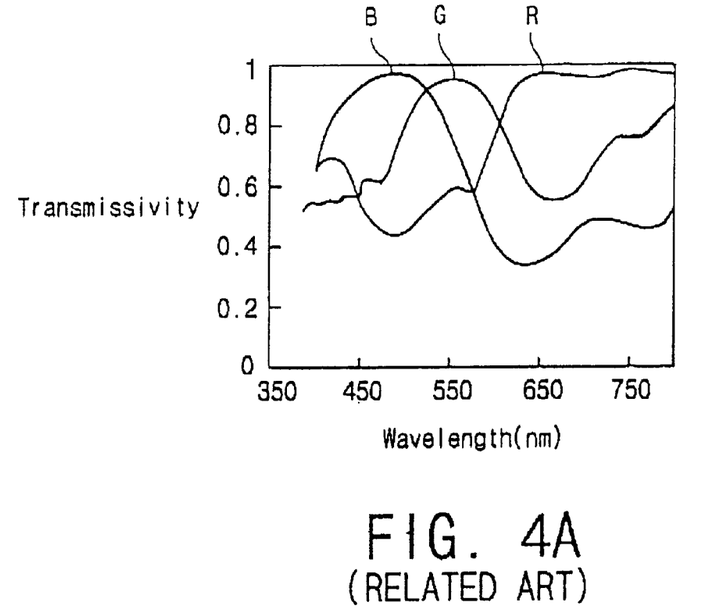
FIGS. 4A and 4B are graphs illustrating transmissivity with respect to the light wavelengths.
Figure 4B:
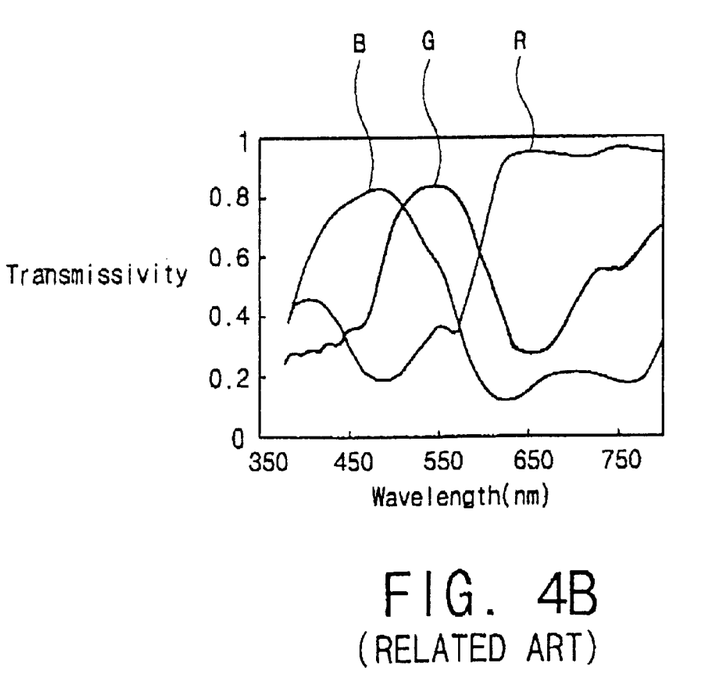

FIGS. 4A and 4B are graphs illustrating transmissivity with respect to the light wavelengths. The graphs are obtained by a spectrum analysis method.

As is well known, all objects have a wavelength-dependent reflectivity, and their color that an observer recognizes is determined by the wavelengths of the light reflected from or transmitted through the object. The wavelength range of visible light is about 380 nm to 780 nm. The visible light region can be broadly divided into red, green, and blue regions. The central wavelength of the red visible light region is about 660 nm, that of green is about 530 nm, and that of blue is about 470 nm.

Each pixel of the LCD device has three sub-pixels so that the reflected light is colored to red (R), green (G) and blue (B) colors and, therefore each color has a dominant wavelength band leading to a high color purity by transmitting the dominant wavelength band for a predetermined color and absorbing other wavelengths.

FIG. 4A shows the relation of transmissivity and wavelength when light passes the color filter once, that is, in the transmissive mode. The blue color filter should transmit the blue color and absorb other colors. But as shown in the graph, since transmissivity of green color is relatively high in a band around 470 nm, the green color is also transmitted through the blue color filter with the blue color.

FIG. 4B shows the relation of transmissivity and wavelength when light passes the color filter twice, that is, in the reflective mode. As known from the graph, since the lines representing each dominant wavelength are steep and distributed (spaced apart), light of the wavelengths other than the dominant wavelength band are well absorbed.

Thus, the color generated by combination of the color filters has different color purity depending on the selected mode. For example, in displaying green color, the color of the transmissive mode is lighter than that of the reflective mode.

Though the color purity varies according to the selected mode, the transflective LCD device only adopts color filters appropriate to the reflective mode, since the color purity of reflective mode is better than that of the transmissive mode. Thus, the color purity that the users feel is different according to the selected mode.

SUMMARY OF THE INVENTION

Accordingly, the present invention is directed to a transflective liquid crystal display device that substantially obviates one or more of the problems due to limitations and disadvantages of the related art.

An object of the invention is to provide a transflective LCD device that can reduce the color purity difference resulting from the color filters adapted for the device regardless of the selected mode without lowering color purity. In other words, reflected light characterized by being reflected off the reflective portions of the reflector experiences substantially the same degree of color filtering as transmitted light characterized by having passed through the transmissive portions of the reflector.

In accordance with the purpose of the invention, as embodied and broadly described, in one aspect the invention includes a transflective liquid crystal display device, including: upper and lower substrates opposing each other; liquid crystal material interposed between the upper and lower substrates; first and second electrodes, arranged in correspondence to said upper and lower electrodes, respectively, to apply an electric field to the liquid crystal material; a reflector having transmissive portions and reflective portions, the reflector being positioned between the liquid crystal material and the lower substrate; a color filter layer positioned between the upper substrate and the liquid crystal material, the color filter layer having first portions aligned with the reflective portions of the reflector and second portions aligned with the transmissive portions of the reflector, each of the second portions having a higher resin density than the first portions; and a backlight device under the lower substrate.

In another aspect, the invention provides a transflective liquid crystal display device including: upper and lower substrates opposing each other; liquid crystal material interposed between the upper and lower substrates; first and second electrodes, arranged in correspondence to said upper and lower electrodes, respectively, to apply an electric field to the liquid crystal material; a reflector having transmissive portions and reflective portions, the reflector being positioned between the liquid crystal material and the lower substrate; a first color filter layer positioned between the upper substrate and the liquid crystal material; a second color filter layer positioned between the lower substrate and the reflector; and a backlight device under the lower substrate.

In another aspect, the invention includes a transflective liquid crystal display device, including: upper and lower substrates opposing each other; liquid crystal material interposed between the upper and lower substrates; first and second electrodes, arranged between the upper and lower electrodes, respectively, to apply an electric field to the liquid crystal material; a reflector having transmissive portions and reflective portions, the reflector being positioned between the liquid crystal material and the lower substrate; a color filter layer positioned between the upper substrate and the liquid crystal material, the color filter layer having first portions aligned with the reflective portions of the reflector and second portions aligned with the transmissive portions of the reflector, the second portions being thicker than the first portions; and a backlight device under the lower substrate.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to the preferred embodiment of the present invention, example of which is illustrated in the accompanying drawings.

Figure 5:
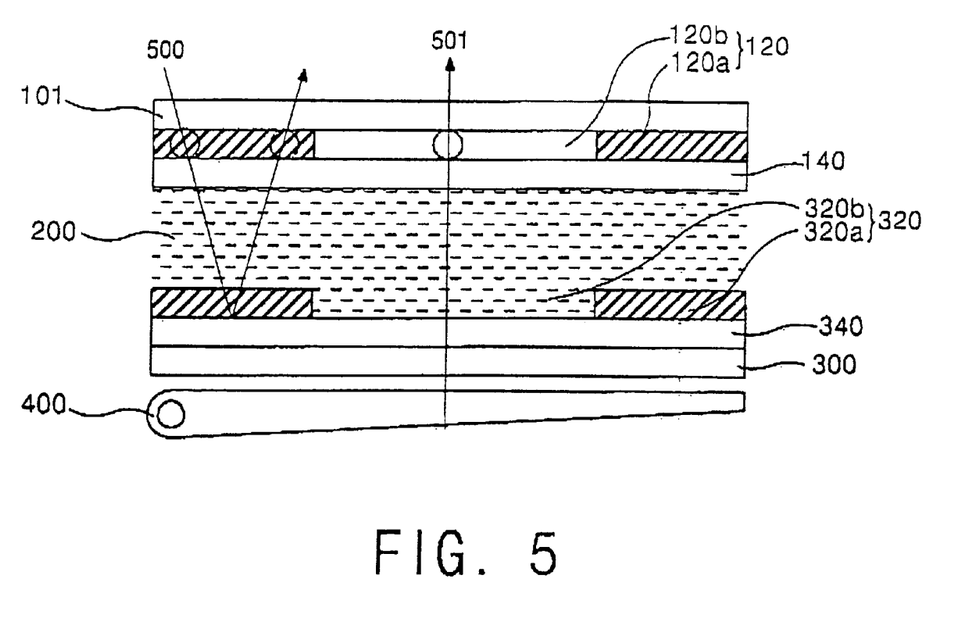
FIG. 5 is a cross-sectional view illustrating a transflective LCD device according to a first preferred embodiment of the invention.

FIG. 5 is a cross-sectional view illustrating a configuration corresponding to one pixel of a transflective LCD device according to a preferred embodiment of the present invention. As shown in FIG. 5, the inventive transflective LCD device includes upper and lower substrates 101 and 300 opposing to each other, liquid crystal material 200 interposed between the upper and lower substrates, and a backlight device 400 under the lower substrate 300. There are also shown first and second electrodes 140 and 340 applying electric field to the liquid crystal material. The first electrode 140 is called a common electrode, since it covers the whole substrate 101, whereas the second electrode 340 is called a pixel electrode, since it is independently arranged per a pixel unit. The first and second electrodes are arranged at the upper and lower substrates 101 and 300 interposing the liquid crystal material 200. The first and second electrodes 140 and 340 are transparent conducting material such as ITO or IZO.

Between the second electrode 340 and the liquid crystal material 200 there is formed a reflector 320 having a transmissive portion 320b and a reflective portion 320a. The transmissive portion 320b has a shape of hole, surrounded by the reflective portion 320a. That is, the reflector 320 has a hole 320b for light transmission, which is filled with the liquid crystal material 200. The reflective portion 320a is a metal portion such as Al, Mo etc.

Alternatively, the reflector 320 can be positioned under the second electrode 340 in a modified design for some transflective LCD devices. This invention does not limit the relative position of the reflector 320 and the second electrode 340.

Figure 6:
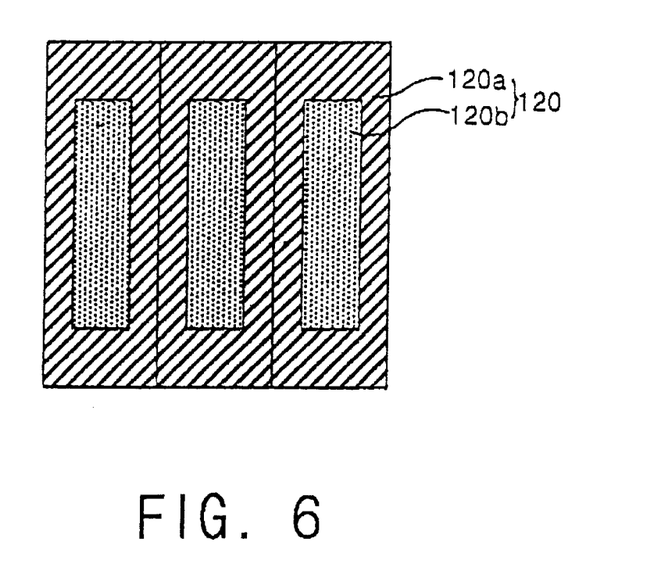
FIG. 6 is a plan view illustrating the color filter of FIG. 5.

Between the first electrode 140 and the upper substrate 101 there is positioned a color filter layer 120 having a first color filter layer 120a and a second color filter layer 120b. The first color filter layer 120a corresponds in alignment position to the reflective portion 320a of the reflector 320, and the second color filter layer 120b corresponds in alignment position to the to the transmissive portion 320b of the reflector 320. Since the transmissive portion 320b or hole is surrounded by the reflective portion 320a, the second color filter 120b is surrounded by the first color filter layer 120a, as shown in FIG. 6. Note that the color filter layers 120 shown in FIG. 6 are for three pixels, whereas FIG. 5 is a cross-sectional view for a unit pixel.

The color filter layer 120 according to the first embodiment of the invention can be made of the same resin. The difference between the first and second color filter layers 120a and 120b can be the density of the resin. The first and second color filter layers 120a and 120b are formed in the same plane. If the first and second color filter layers 120a and 120b have the same density as each other and are adopted for the transflective LCD device explained above, the color purity of the first color filter layer 120a would be higher than the second color filter layer 120b. The first color filter layer 120a serves as a color filter in a reflective mode using ambient light 500 and the second color filter layer 120b serves as a color filter in a transmissive mode using light 501 from the backlight device 400. Therefore, in order to provide substantially uniform color purity regardless of the selected mode, it is necessary to enhance color purity of the second color filter layer 120b. To do this, the density of the resin of the second color filter layer 120b can be made higher than the first color filter layer 120a in this embodiment. The density of the resin can be different depending on the resin selected for the first and second color filter layers 120a and 120b.

Figure 7:
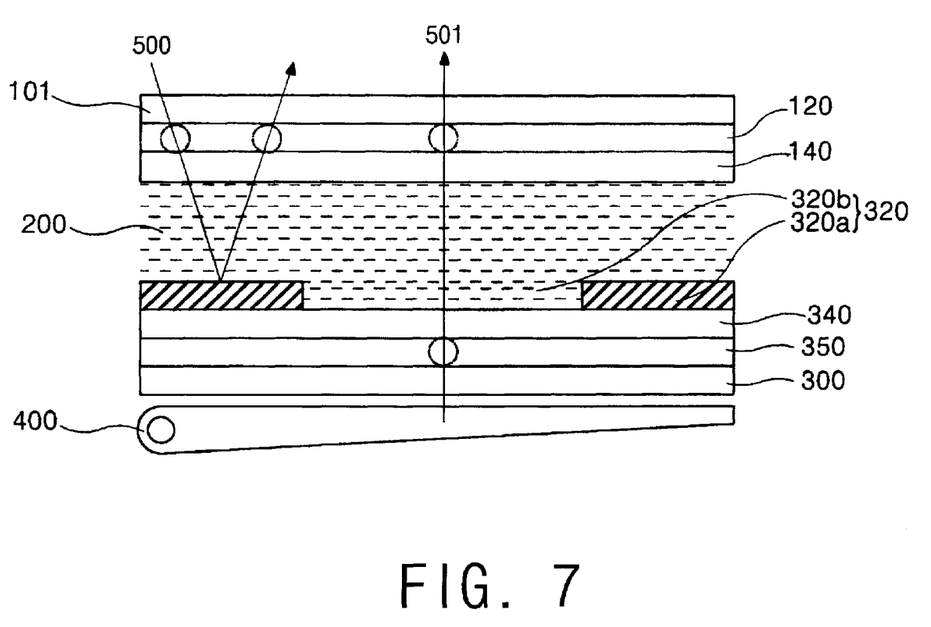
FIG. 7 is a cross-sectional view illustrating a transflective LCD device according to a second preferred embodiment of the invention.

FIG. 7 shows a transflective LCD device according to the second embodiment of the invention. The LCD device of FIG. 7 is similar to that shown in FIG. 5, thus explanations of other elements of LCD device are omitted except the different portions.

The differences between the two LCD devices of FIGS. 5 and 7 are that the latter has an additional color filter layer 350 formed on the lower substrate 300 and that the color filter 120 on the liquid crystal material 200 has a uniform density of resin. The thickness of the additional color filter layer 350 is substantially the same as that of the color filter 120.

In this embodiment, to provide uniform color purity regardless of the selected mode, the additional or second color filter layer 350 is positioned between the lower substrate 300 and the reflector 320. Therefore in a transmissive mode, the light 501 from the backlight device 400 passes the second color filter layer 350, and then passes through the transmissive portion 320b of the reflector 320, and finally passes the first color filter layer 120. That is, the light 501 in the transmissive mode passes the second and first color filter layers 350 and 120. Since the light 500 in the reflective mode passes the first color filter layer 120 twice, the color purity of both modes are the substantially the same as each other.

Figure 8:
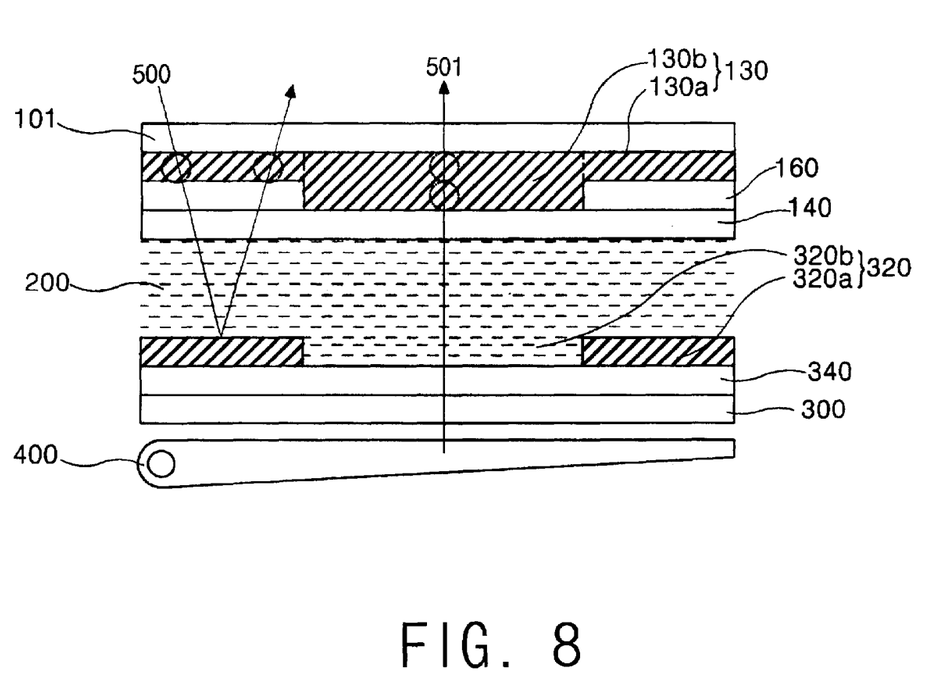
FIG. 8 is a cross-sectional view illustrating a transflective LCD device according to a third preferred embodiment of the invention.

FIG. 8 shows a transflective LCD device according to the third embodiment of the invention. The LCD device of this embodiment is similar to the LCD device of the first embodiment except that the varying thickness of the color filter is positioned between the upper substrate 101 and the first electrode 140. The color filter layer 130 of this embodiment has a reflective region 130a and a transmissive region 130b. The reflective region 130a corresponds to the reflective portion 320a of the reflector 320, and the transmissive region 130b to the transmissive portion 320b of the reflector 320b. The density of the color filter layer 130 can be uniform. But the thickness of the transmissive region 130b is about twice of that of the reflective region 130a. The gap between the reflective region 130b and the first electrode 140 is filled with a substantially translucent insulating layer 160 in order to achieve a plane surface for the first electrode 140. The insulating layer 160 can be made of BCB (benzocyclobutene) or acryl.

In this embodiment, since the transmissive region 130b of the color filter layer 130 is thicker than the reflective region 130a, the light 501 from the backlight device 400 passes once through the thicker region 130b of the color filter 130 in a transmissive mode, whereas the light 500 from the outside of the device passes twice through the thinner region 130a of the color filter 130 in a reflective mode. Thus, the total thickness of the color filter layer 130 experienced by the light 501 from the backlight device 400 and the light 500 from the outside substantially equals each other. Therefore, the color purity that users perceive can be substantially uniform or substantially unchanged regardless of the selected mode.

Figure 9:
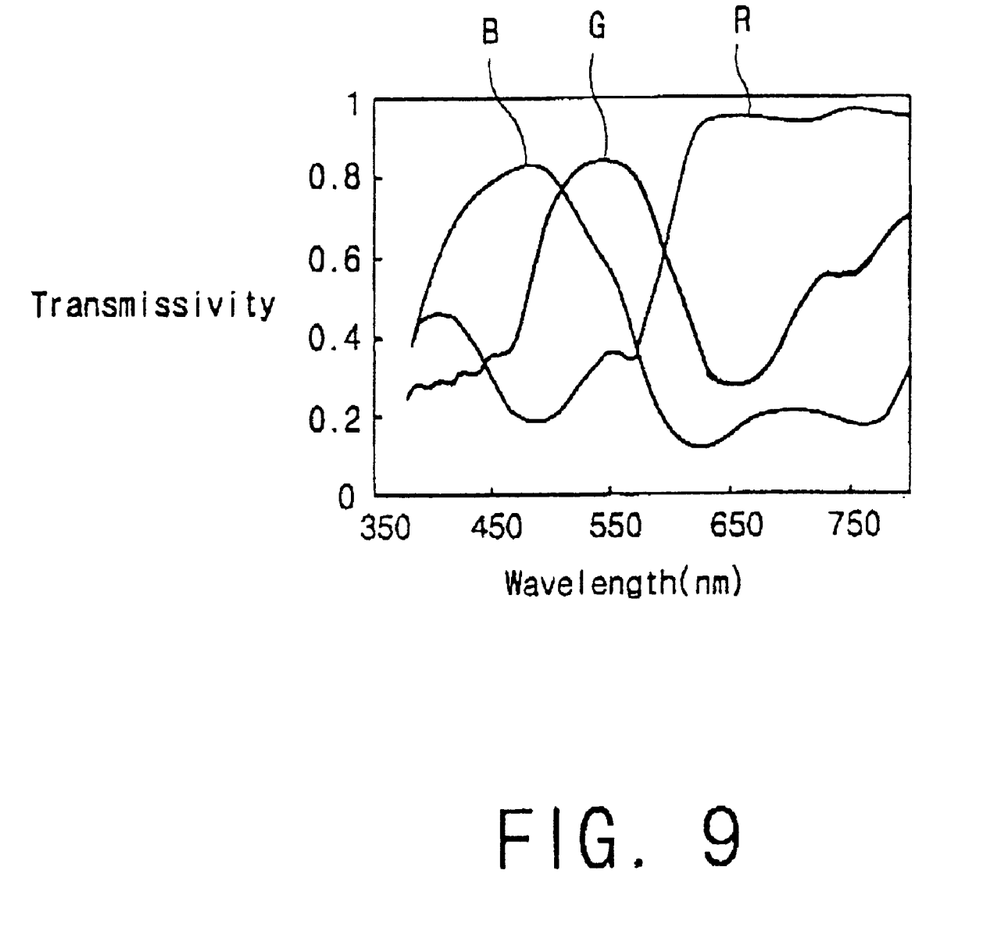
FIG. 9 is a graph illustrating a transmissivity with respect to the light.

FIG. 9 is a graph illustrating the relation of transmissivity and wavelength when light passes through the LCD device of the preferred embodiments of the invention. According to the embodiments of the invention, since the light 501 from the backlight device 400 in the transmissive mode experiences similar condition to the light 500 in the reflective mode, the relation of the transmissivity and wavelength in transmissive mode can be similar to that of the reflective mode. Thus, the relation depicted in FIG. 9 is similar to FIG. 4B in the sense that the lines representing each dominant wavelength are steep and distributed (spaced apart), so light of wavelengths other than the dominant wavelength band are well absorbed, enhancing color purity.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A transflective liquid crystal display device comprising:
   upper and lower substrates opposing each other;
   liquid crystal material interposed between the upper and lower substrates;
   first and second electrodes, arranged in correspondence to said upper and lower substrates, respectively, to apply an electric field to the liquid crystal material;
   a reflector having transmissive portions and reflective portions, the reflector being positioned between the liquid crystal material and the lower substrates;
   a color filter layer positioned between the upper substrate and the liquid crystal material, the color filter layer having first portions aligned with the reflective portions of the reflector and second portions aligned with the transmissive portions of the reflector, the first portions of the color filter layer surrounding the second portion of the color filter layer, each of the second portions corresponding to a pixel unit and having a higher resin density than the first portions; and
   a backlight device under the lower substrate.

2. The device of claim 1, wherein the reflective portions of the reflector surround a transmissive portions of the reflector.

3. The device of claim 1, wherein each of the transmissive portions of the reflector has a shape of a hole.

4. The device of claim 1, wherein the first and second color filter layers are made of the same resin.

5. A transflective liquid crystal display device comprising:
   upper and lower substrates opposing each other;
   liquid crystal material interposed between the upper and lower substrates;
   first and second electrodes, arranged in correspondence to said upper and lower substrates, respectively, to apply an electric field to the liquid crystal material;
   a reflector having transmissive portions and reflective portions, the reflector being positioned between the liquid crystal material and the lower substrate;
   a first color filter layer positioned between the upper substrate and the liquid crystal material;
   a second color filter layer positioned between the lower substrate and the reflector such that light only passes through portions of the second color filter layer that are aligned with the transmissive portions of the reflector; and
   a backlight device under the lower substrate.

6. The device of claim 5, wherein the reflective portions of the reflector surround a transmissive portion of the reflector.

7. The device of claim 5, wherein each of the transmissive portions of the reflector has a shape of a hole.

8. The device of claim 5, wherein the first and second color filter layers are made of the same resin.

9. A transflective liquid crystal display device comprising:
   upper and lower substrates opposing each other;
   liquid crystal material interposed between the upper and lower substrates;
   first and second electrodes, arranged in correspondence to said upper and lower substrates, respectively, to apply an electric field to the liquid crystal material;
   a reflector having transmissive portions and reflective portions, the reflector being positioned between the liquid crystal material and the lower substrate;
   a color filter layer positioned between the upper substrate and the liquid crystal material, the color filter layer having first portions aligned with the reflective portions of the reflector and second portions aligned with the transmissive portions of the reflector, the first portions of the color filter layer surrounding the second portions of the color filter layer, each second portion corresponding to a pixel unit and being thicker than each first portion, wherein the first electrode is located between the liquid crystal material and the upper substrate, and wherein between the first portions of the color filter layer and the first electrode there is formed insulating layer portions; and
   a backlight device under the lower substrate.

10. The device of claim 9, wherein the thickness of the second color filter layer is twice the thickness of the first color filter.

11. The device of claim 9, wherein the reflective portions of the reflector surround a transmissive portion of the reflector.

12. The device of claim 9, wherein each of the transmissive portions of the reflector has a shape of a hole.

13. The device of claim 5, wherein the first and second color filter layers are made of the same resin.

14. The device of claim 5, where the second color filter layer has substantially the same thickness as the first color filter layer.

15. A transflective liquid crystal display device comprising:
   upper and lower substrates opposing each other;
   liquid crystal material interposed between the upper and lower substrates;
   first and second electrodes, arranged in correspondence to said upper and lower substrates, respectively, to apply an electric field to the liquid crystal material;
   a reflector having transmissive portions and reflective portions, the reflector being positioned between the liquid crystal material and the lower substrate;
   at least a first color filter layer positioned between the upper substrate and the liquid crystal material; and
   a backlight device under the lower substrate,
   wherein reflected light characterized by being reflected off reflective portions of a reflector experiences substantially the same degree of the color filtering as transmitted light characterized by having passed through the transmissive portions of the reflector, wherein the first color filter layer has first portions aligned with the reflective portions of the reflector and second portions aligned with the transmissive portions of the reflector, the first portions of the color filter layer surrounding the second portions of the color filter layer, a pair of first and second portions corresponding to a pixel unit.

16. The device of claim 15, wherein at least one of the density and the thickness of the first portions differ from the second portions.

17. The device of claim 15, further comprising a second color filter layer positioned between the lower substrate and the reflector, wherein at least one of the cumulative density and cumulative thickness of color filter material through which reflected light passes differs from said at least one of cumulative density and cumulative thickness of color filter material through the transmitted light passes.

* * * * *